(12) United States Patent
Hartz et al.

(10) Patent No.: US 10,935,065 B2
(45) Date of Patent: Mar. 2, 2021

(54) METHOD FOR SETTING A SCREW

(71) Applicant: Hilti Aktiengesellschaft, Schaan (LI)

(72) Inventors: Martin Hartz, Rankweil (AT); Niels Goos, Landsberg (DE); Simon Velten, Nenzing (AT)

(73) Assignee: Hilti Aktiengesellschaft, Schaan (LI)

( * ) Notice: Subject to any disclaimer, the term of this patent is extended or adjusted under 35 U.S.C. 154(b) by 173 days.

(21) Appl. No.: 15/751,385

(22) PCT Filed: Jul. 26, 2016

(86) PCT No.: PCT/EP2016/067769
§ 371 (c)(1),
(2) Date: Feb. 8, 2018

(87) PCT Pub. No.: WO2017/025318
PCT Pub. Date: Feb. 16, 2017

(65) Prior Publication Data
US 2018/0231045 A1 Aug. 16, 2018

(30) Foreign Application Priority Data
Aug. 12, 2015 (EP) .................................. 15180753

(51) Int. Cl.
*B23G 1/16* (2006.01)
*F16B 25/00* (2006.01)
(Continued)

(52) U.S. Cl.
CPC ............ *F16B 25/0026* (2013.01); *B23G 1/16* (2013.01); *B23P 19/048* (2013.01); *B23P 19/06* (2013.01);
(Continued)

(58) Field of Classification Search
CPC .............. F16B 25/0026; F16B 25/0047; F16B 25/0073
See application file for complete search history.

(56) References Cited

U.S. PATENT DOCUMENTS 4,439,077 A 3/1984 Godsted
4,842,467 A 6/1989 Armstrong
(Continued)

FOREIGN PATENT DOCUMENTS

CN 1978924 A 6/2007
CN 200946622 Y 9/2007
(Continued)

OTHER PUBLICATIONS

English Translation DE19735280 Gerhard (Year: 1999).*
(Continued)

*Primary Examiner* — Jason L Vaughan
*Assistant Examiner* — Amanda Kreiling
(74) *Attorney, Agent, or Firm* — Crowell & Moring LLP

(57) ABSTRACT

A method for setting a screw, which has an external thread in a front region and a drive in a rear region for introducing a torque into the screw, in a drilled hole in a substrate of a mineral material includes producing an internal thread in the drilled hole by a threaded drill provided with a cutting thread and then introducing the screw into the drilled hole and in so doing the external thread of the screw is screwed into the internal thread, produced by the threaded drill, in the drilled hole. The external diameter of the cutting thread of the threaded drill is smaller than the external diameter of the external thread of the screw.

9 Claims, 1 Drawing Sheet

(51) Int. Cl.
*B23P 19/04* (2006.01)
*B23P 19/06* (2006.01)
*B28D 1/14* (2006.01)

(52) U.S. Cl.
CPC .......... *B28D 1/146* (2013.01); *F16B 25/0047* (2013.01); *F16B 25/0073* (2013.01); *B23G 2200/46* (2013.01); *B23G 2210/04* (2013.01); *B23G 2225/00* (2013.01)

(56) References Cited

U.S. PATENT DOCUMENTS

| | | | | |
|---|---|---|---|---|
| 5,643,269 | A * | 7/1997 | Harle | A61B 17/1655 606/312 |
| 6,296,433 | B1 * | 10/2001 | Forsell | F16B 25/00 411/386 |
| 7,484,920 | B2 | 2/2009 | Wieser et al. | |
| 7,740,435 | B2 | 6/2010 | Gstach et al. | |
| 8,182,185 | B2 | 5/2012 | Gahn et al. | |
| 8,182,186 | B2 | 5/2012 | Huber et al. | |
| 8,696,477 | B2 | 4/2014 | Huber et al. | |

FOREIGN PATENT DOCUMENTS

| | | |
|---|---|---|
| DE | 197 35 280 A1 | 2/1999 |
| DE | 199 05 845 A1 | 8/2000 |
| EP | 0 625 400 A1 | 11/1994 |

OTHER PUBLICATIONS

Drawings Gerhard DE19735280 (Year: 1991).*
PCT/EP2016/067769, International Search Report dated Oct. 14, 2016, with partial English translation (Six (6) pages).

* cited by examiner

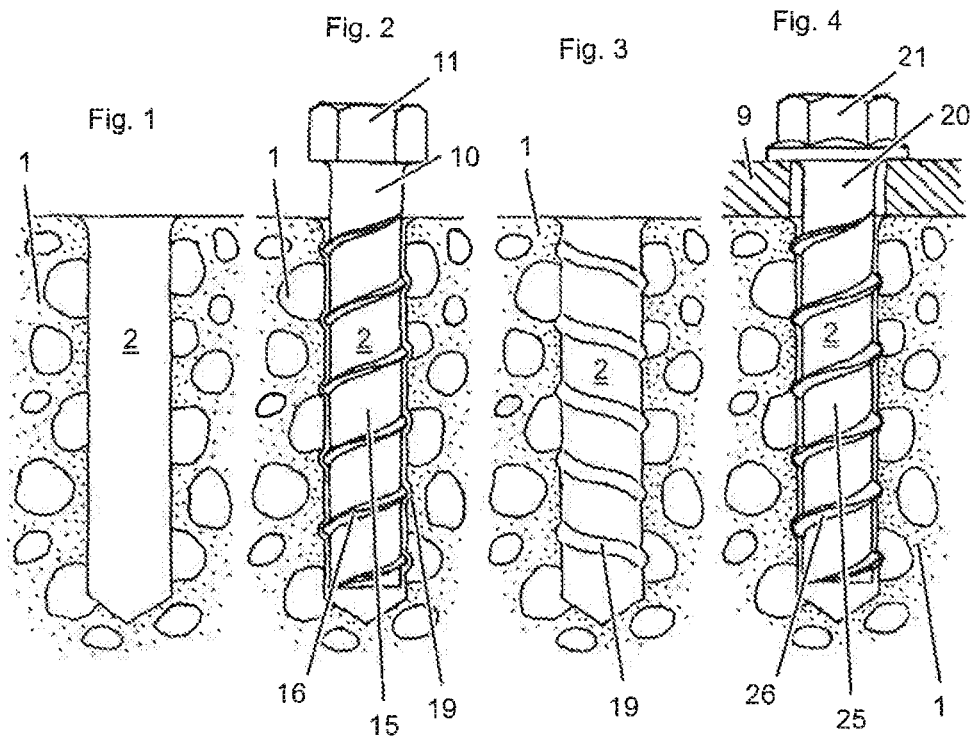
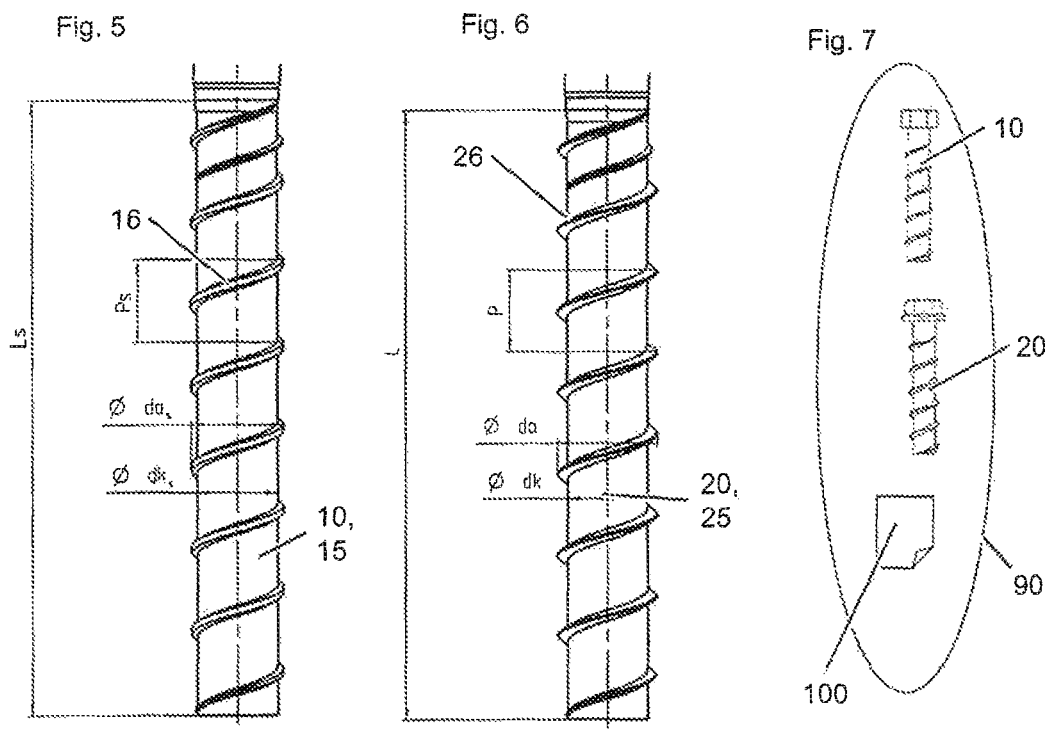

METHOD FOR SETTING A SCREW

This application claims the priority of International Application No. PCT/EP2016/067769, filed Jul. 26, 2016, and European Patent Document No. 15180753.4, filed Aug. 12, 2015, the disclosures of which are expressly incorporated by reference herein.

BACKGROUND AND SUMMARY OF THE INVENTION

The invention relates to a method for setting a screw, which has an external thread in a front region and a drive in a rear region for introducing a torque into the screw, in a drilled hole in a substrate of a mineral material. Such a method provides that:
  an internal thread is produced in the drilled hole by means of a threaded drill provided with a cutting thread, and
  then, the screw is introduced, particularly screwed, into the drilled hole and in so doing the external thread of the screw is screwed into the internal thread, produced by the threaded drill, in the drilled hole.

The invention further relates to packages comprising objects for carrying out such a method.

It is known from DE 19735280 A1 to precut a thread prior to screwing in a concrete screw, whereby greater freedom in selecting the material for the concrete screw is meant to be provided.

DE 19905845 A1 describes a screw-fastening set for concrete, in which a screw and a threaded drill constructed depending on the type of screw are provided, wherein the core diameter of the threaded drill is smaller than the core diameter of the screw, so that the play at the core of the screw is less than the play at the core of the threaded drill. On the one hand, the aim is to allow the swarf occurring during thread cutting to be carried away outwardly by the threaded drill, and on the other to have the screw housed with a permanent seat in the precut thread. Preferably, the external diameter of the screw in the region of the cylindrical thread is meant to be smaller than the external diameter of the threaded drill, whereby the intended result is to have no jamming taking place on the external circumference of the screw thread when screwing the screw into the thread pitch.

A tool for producing an internal thread in concrete, masonry or similar is known from EP 0625400A1.

U.S. Pat. No. 4,439,077 A describes a concrete screw, which is designed in such a manner that swarf is compressed during the screw-in process. Another concrete screw is known from U.S. Pat. No. 4,842,467A.

U.S. Pat. Nos. 8,696,477 A, 8,182,185 A, 7,740,435 A, 8,182,186 A, and 7,484,920 A disclose concrete screws, which have cutters in the thread course, the cutters having a greater hardness compared to the remaining thread. For the remaining screw regions, this enables one to use a material with comparably high corrosion-resistance, even if this were to have a comparably low hardness.

The object of the invention is to specify a method for setting a screw in a drilled hole in a substrate of a mineral material, particularly concrete, with which a particularly reliable setting of the screw is possible with minimal effort, and with which particularly good load values and particularly good corrosion resistance can be achieved, as well as packages comprising objects to carry out such a method.

A method according to the invention is characterized in that the external diameter of the cutting thread of the threaded drill is smaller than the external diameter of the external thread of the screw.

A fundamental concept of the invention can be seen in the fact that by means of the threaded drill, an internal thread is precut in the drilled hole, into which the external thread of the screw is subsequently screwed, wherein the cutting thread of the threaded drill is dimensioned in such a manner that the precut internal threads are of a smaller size compared to the external thread of the screw.

Within the scope of the invention, it was observed that when setting screws in mineral materials, particularly also in high- or ultra-high-strength concrete and particularly in the event of rebar contact, an undesired blocking of the screw may result. This was observed particularly in screws with cutters in the course of the thread, and may be attributed to an undesired interaction of the surfaces of the cutters and/or the surfaces of the thread recesses provided for the cutters with the substrate. In addition, it was observed within the scope of the invention that in the event of rebar contact, high wear or in extreme cases even a complete destruction of the thread winding can occur, which can result in performance losses or in an extreme case in spinning, wherein the attachment point may become unusable. This is where the invention comes in and according to a first inventive basic concept, it provides for precutting a pilot thread, namely the external thread, in the concrete substrate by means of a threaded drill. One can hereby easily counteract the blocking mentioned above and the aforementioned undesired increased wear, particularly in the event of rebar contact, so that particularly high reliability is assured. According to a second basic concept of the invention, the pilot thread thereby has a smaller size compared to the external thread of the screw, in other words, the thread produced with the threaded drill is smaller in its external diameter than the external diameter of the screw. Due to this smaller size, the thread tip of the external thread of the screw cuts into the substrate when screwing in the screw, so that when screwing in the screw, specifically loose substrate particles are produced. In turn, these substrate particles may ensure an advantageous compression of the screw against the surrounding wall of the drilled hole, which stabilizes the drilled hole and can therefore ensure particularly good load values. According to the invention, particularly high load values can thus be obtained with particularly high reliability.

The external diameter of a thread may generally refer to the diameter of a cylinder enveloping the thread in particular. The cutting thread of the threaded drill and/or the external thread of the screw are preferably cylinder threads. Preferably, the external diameter of the cutting thread of the threaded drill is greater than at least 50%, preferably greater than at least 75% or 80%; the thread length of the cutting thread of the threaded drill is constant. Alternatively or additionally, the external diameter of the external thread of the screw is greater than at least 50%, preferably greater than at least 75% or 80%; the thread length of the external thread of the screw is constant.

The substrate of a mineral material may be a concrete substrate in particular. The threaded drill preferably has a shaft, on which the cutting thread is arranged. The screw preferably also has a shaft, on which the external thread is arranged. In the time between producing the internal thread in the drilled hole and the subsequent screwing in of the screw, one or more interim steps, such as cleaning steps, may be provided. Preferably, these interim steps leave the structure of the internal thread produced by the threaded drill at least almost unchanged. Preferably, the threaded drill can machine the substrate in a cutting manner to produce the external thread.

Notably, the cutting thread of the threaded drill and the external thread of the screw go in the same direction.

It is particularly preferred that the external diameter of the cutting thread of the threaded drill is 0.85 to 0.92 times the external diameter of the external thread of the screw. Experiments have shown that, on the one hand, there is particularly good load-bearing capacity in this range since substrate particles used for compression in the drilled hole are sufficiently available, and that on the other, particularly good setting behavior is assured. In particular, the screw can be set with relative ease, although it does not simply fall into the drilled hole, i.e., there is a feeling of being solidly set.

Another advantageous design lies in the fact that the thread pitch of the cutting thread of the threaded drill deviates by less than 3%, preferably less than 1%, from the thread pitch of the external thread of the screw. Reliability and performance can hereby be further improved.

Furthermore, it is preferred that the core diameter of the cutting thread of the threaded drill deviates by less than 3%, preferably less than 1%, from the core diameter of the external thread of the screw. Reliability can hereby be increased even more and in particular, undesired damage to the drilled hole may be countered.

In particular, it may be provided that the thread length of the cutting thread of the threaded drill deviates by less than 3%, preferably less than 1%, from the thread length of the external thread of the screw. Reliability can hereby also be increased further, since one can hereby ensure in a particularly simple manner that the pilot thread has the correct depth.

For practical purposes, when screwing in the screw, an add-on part is set on the substrate, preferably by having the screw inserted through a recess in the add-on part into the drilled hole. In this way, when the screw is screwed in for the first time, the add-on part is simultaneously set. Reliability can hereby be further increased since one can ensure in a particularly simple manner that when expanding the pilot thread any occurring substrate particles also actually contribute to the compression and thus to the greater load-bearing capacity of the screw. Preferably, the add-on part can be set in a form-fitting manner on the substrate, for example by a screw head provided in the rear region of the screw.

The drive may be a screw head for example, i.e., particularly a locally profile-enlarged region of the screw. The screw head may have an external polygon or an internal polygon. However, the drive may also be a simple internal polygon.

The invention also relates to a package containing a screw and/or a threaded drill, and also containing operating instructions, which teach a method according to the invention using the screw and the threaded drill respectively. The package thus contains operating instructions, which teach the method steps according to the invention, as well as at least one of the objects required for carrying out the method. In particular, the teaching for carrying out the method according to the invention may be put down in writing in the operating instructions. A package commonly refers in particular to its entirety made up of the packaging and the packaged goods.

The invention also relates to a package containing the objects essential for carrying out the method, i.e., containing a screw for screwing into the drilled hole in a substrate of a mineral material, wherein the screw has an external thread in a front region and a drive in a rear region for introducing a torque into the screw, and a threaded drill equipped with a cutting thread, wherein the external diameter of the cutting thread of the threaded drill is smaller than the external diameter of the external thread of the screw.

Features mentioned in connection with the method according to the invention may also be used in regard to the packages according to the invention, and conversely features mentioned in connection with the packages according to the invention may also be used in the method according to the invention.

The invention is explained in greater detail below using preferred embodiments, which are depicted schematically in the attached drawings; wherein individual features of the embodiments shown below may in principle be executed individually or in any combination within the scope of the invention.

BRIEF DESCRIPTION OF THE DRAWINGS

FIGS. 1 to 4 are schematic images of sequential stages in carrying out the method according to the invention;

FIG. 5 is a detailed view of the threaded drill, which is used in the method according to FIGS. 1 to 4, as seen from the side;

FIG. 6 is a detailed view of the screw, which is used in the method according to FIGS. 1 to 4, as seen from the side; and FIG. 7 is a schematic view of a package according to the invention.

DETAILED DESCRIPTION OF THE DRAWINGS

FIGS. 1 to 4 depict various stages in carrying out a method according to the invention.

Initially in the method, as shown in FIG. 1, a preferably at least almost cylindrical drilled hole 2 is provided in a substrate 1 of a mineral material, particularly concrete.

Then, as shown in FIG. 2, a threaded drill 10 is inserted into drilled hole 2. Threaded drill 10 has a preferably at least almost cylindrical shaft 15 as well as a spiral-shaped cutting thread 16, which is arranged on shaft 15. In a rear region, threaded drill 10 has a drive 11, depicted for example purposes as a head, particularly a hexagonal head, for introducing a torque in shaft 15. Cutting thread 16 has an external diameter $Øda_S$ (cf. FIG. 5), which is greater than the interior diameter of drilled hole 2. Therefore, cutting thread 16 cuts its way into substrate 1 surrounding drilled hole 2 and produces an internal thread 19 in drilled hole 2. To screw in threaded drill 10 into drilled hole 2 in a particularly easy manner, core diameter $Ødk_S$ of cutting thread 16 of threaded drill 10 (cf. FIG. 5) may preferably be smaller than the internal diameter of drilled hole 2.

In the next step, as shown in FIG. 3, threaded drill 10 is screwed back out of the drilled hole by turning in the opposite direction. Internal thread 19 is thereby left in drilled hole 2.

Then, as shown in FIG. 4, an add-on part 9 is arranged in front of drilled hole 2 and a screw 20 is inserted through a recess in add-on part 9 into drilled hole 2. Screw 20 has a preferably at least almost cylindrical shaft 25 as well as a spiral-shaped external thread 26, which is arranged on shaft 25. In a rear region, screw 20 has a drive 21 depicted as a head, particularly a hexagonal head, for introducing a torque in shaft 25 and for the form-fitting holding of add-on part 9.

External thread 26 of screw 20 has an external diameter $Øda$ (cf. FIG. 6), which is larger than external diameter $Øda_S$ of cutting thread 16, and which is thus larger than the external diameter of internal thread 19 produced by cutting thread 16 in drilled hole 2. Consequently, internal thread 19 is radially expanded somewhat when screwing in screw 20.

Loose substrate particles hereby fall into drilled hole 2, which can ensure a compression of shaft 25 of the screw and thus a radial support of drilled hole 2, whereby particularly good load values can be obtained for screw 20. For screwing in screw 20 in a particularly easy manner into drilled hole 2, core diameter Ødk of external thread 26 of screw 20 (cf. FIG. 6) may preferably be smaller than the internal diameter of drilled hole 2.

As shown particularly in FIGS. 5 and 6, the following relationships apply to cutting thread 16 of threaded drill 10 and external thread 26 of screw 20, wherein the subscript "S" hereinafter indicates the parameter of threaded drill 10 in each case:

For external diameter $Øda_S$ of cutting thread 16 of threaded drill 10 and external diameter $Øda$ of external thread 26 of screw 20, respectively:

$$Øda_S < Øda,$$

preferably $Øda_S < 0.92 \times Øda$ and/or $Øda_S > 0.85 \times Øda$

For thread length $L_S$ of cutting thread 16 of threaded drill 10 and thread length L of external thread 26 of screw 20 respectively, it is preferred that:

$$L_S = L \pm 3\%, \text{ preferably } L_S = L \pm 1\%.$$

For thread pitch $P_S$ of cutting thread 16 of threaded drill 10 and thread pitch P of external thread 26 of screw 20 respectively, it is preferred that:

$$P_S = P \pm 3\%, \text{ preferably } P_S = P \pm 1\%.$$

For core diameter $Ødk_S$ of cutting thread 16 of threaded drill 10 and core diameter $Ødk$ of external thread 26 of screw 20 respectively, it is preferred that:

$$Ødk_S = Ødk \pm 3\%, \text{ preferably } Ødk_S = Ødk \pm 1\%.$$

FIG. 7 depicts a schematic view of a package 90 according to the invention, which contains a screw 20, a threaded drill 10, and operating instructions 100. Wherein operating instructions 100 describe a method according to the invention.

The invention claimed is:

1. A method for setting a screw in a drilled hole in a concrete substrate, wherein the screw has an external thread in a front region and a drive in a rear region, comprising the steps of:

producing an internal thread in the drilled hole in the concrete substrate by a threaded drill provided with a cutting thread; and then following the producing, inserting the screw into the drilled hole in the concrete substrate and screwing the external thread of the screw into the internal thread in the drilled hole in the concrete substrate, which internal thread has been produced by the threaded drill;

wherein an external diameter of the cutting thread of the threaded drill is smaller than an external diameter of the external thread of the screw.

2. The method according to claim 1, wherein the external diameter of the cutting thread of the threaded drill is 0.85 to 0.92 times the external diameter of the external thread of the screw.

3. The method according to claim 1, wherein a thread pitch of the cutting thread of the threaded drill deviates by less than 3% of a thread pitch of the external thread of the screw.

4. The method according to claim 1, wherein a core diameter of the cutting thread of the threaded drill deviates by less than 3% of a core diameter of the external thread of the screw.

5. The method according to claim 1, wherein a thread length of the cutting thread of the threaded drill deviates by less than 3% of a thread length of the external thread of the screw.

6. The method according to claim 1, wherein during the screwing, an add-on part is simultaneously set on the concrete substrate.

7. The method according to claim 1, wherein the drive is a screw head.

8. The method according to claim 1, wherein the screwing of the external thread of the screw into the internal thread in the drilled hole in the concrete substrate radially expands the internal thread which produces loose concrete substrate particles that fall into the drilled hole in the concrete substrate and compress a shaft of the screw.

9. The method according to claim 1, wherein there is no interim step between the step of producing the internal thread in the drilled hole in the concrete substrate by the threaded drill and the steps of inserting the screw into the drilled hole in the concrete substrate and screwing the external thread of the screw into the internal thread in the drilled hole in the concrete substrate.

* * * * *